(No Model.)

E. O. WIRES.
DISH HOLDER.

No. 251,754. Patented Jan. 3, 1882.

WITNESSES
Frank G. Parker
Henry L. Washburn

INVENTOR
Edwin O. Wires

UNITED STATES PATENT OFFICE.

EDWIN O. WIRES, OF BOSTON, MASSACHUSETTS.

DISH-HOLDER.

SPECIFICATION forming part of Letters Patent No. 251,754, dated January 3, 1882.

Application filed June 9, 1881. (No model.)

*To all whom it may concern:*

Be it known that I, EDWIN O. WIRES, of Boston, Suffolk county, and State of Massachusetts, have invented a new Improvement in Devices for Holding and Turning Dishes, of which the following is a specification.

The object of my invention is to furnish a convenient method for handling dishes while being cooked or served.

A perfectly-cooked dish requires an even temperature upon all sides, and as the usual devices for heating are imperfect the desired result is obtained by frequently turning the dish. This is generally inconvenient, and often the hands are burned and the contents of the dish spilled. My device entirely overcomes these objectionable features. I attain this by the device illustrated in the accompanying drawings, in which—

Figure 1:
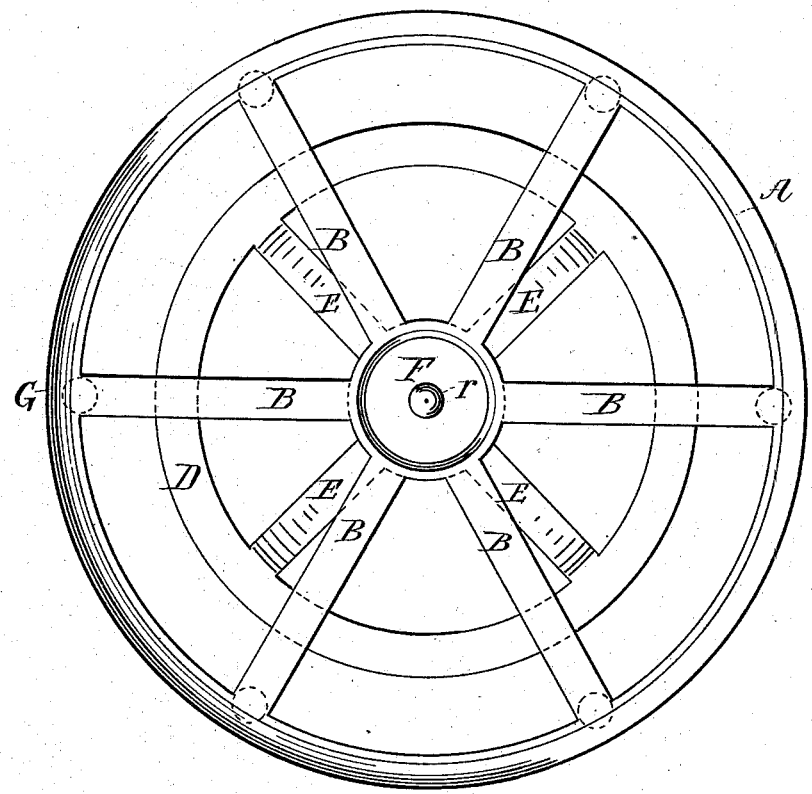
Figure 2:
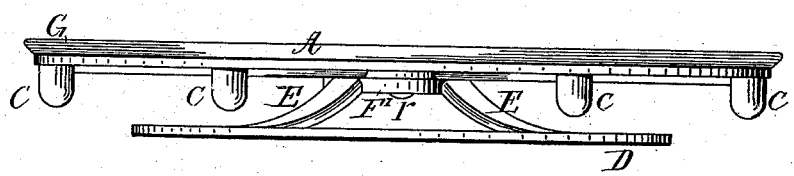
Figure 3:
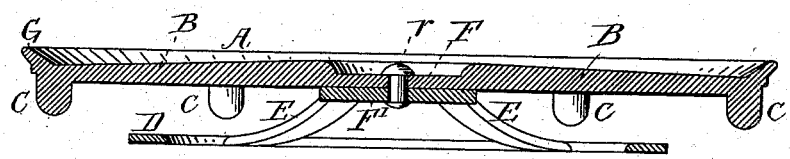

Figure 1 is a top view of the entire device. Fig. 2 is an elevation of the same. Fig. 3 is a vertical section of the same.

Similar letters refer to similar parts in the several views.

A represents the circumference of a flat revolving metal frame of diameter corresponding with that of the dish to be supported and of thickness sufficient to bear the required weight, made with a slightly-raised rim, G, upon the upper side, and with slight projections C C depending from the under side of said frame at suitable intervals along its circumference, and with arms B B converging to the center F.

D represents the circumference of a similar stationary metal frame, made with curved arms E E, arranged in such form that the center F' is raised about one inch above the level of the circumference D. The two frames are then placed one above the other, and the centers F and F' are joined by the loose rivet r, so that the upper frame turns readily upon the lower.

While by preference I construct said frames in segments with arms, as above described, it will readily be seen that they may be made in a solid form and adjusted to each other in like manner. This will in some measure depend upon the particular kind of metal used in their construction.

In carrying my invention into effect the dish is placed upon the revolving frame, the rim G preventing the dish from slipping off. As in cooking the dish is raised from the heated surface, a perfectly-baked under-crust is insured. In fact, it makes no difference whether the oven or other appliance is one that burns the bottom crust or does not bake it sufficiently, since my device secures an even temperature upon the upper and under sides of the dish. The dish is easily turned by touching the projections C C with a small stick, a knife, spoon, or other convenient article at hand, which causes the upper frame to revolve without the necessity of removing the dish or of placing the hands in contact with it.

Having fully described my invention, what I claim as new, and desire to secure by Letters Patent, is—

1. As a new article of manufacture, a device for holding dishes which is made of two parts, so constructed and arranged that one part serves as a base upon which the other part revolves, all substantially as set forth.

2. The combination of the frame A B, made with a raised rim, G, upon the upper surface and the projections C C upon the lower surface, with the frame D E, made with a raised center, F', and the rivet r, all constructed and arranged substantially as set forth.

EDWIN O. WIRES.

Witnesses:
GEORGE W. CHASE,
EDWIN P. WIRES.